July 7, 1931.  R. E. ACKLEY  1,813,598

BOOK TRIMMING MACHINE

Filed March 17, 1927    5 Sheets-Sheet 5

Inventor:
Raymond E. Ackley,
by Dyrenforth, Lee, Chritton & Wiles
Attys.

Patented July 7, 1931

1,813,598

UNITED STATES PATENT OFFICE

RAYMOND E. ACKLEY, OF CHICAGO, ILLINOIS, ASSIGNOR TO R. R. DONNELLEY & SONS COMPANY, OF CHICAGO, ILLINOIS, A CORPORATION OF ILLINOIS

BOOK TRIMMING MACHINE

Application filed March 17, 1927. Serial No. 176,092.

This invention relates to book trimming machines and more particularly to those of plunger-operated type in which the books are forced through a series of cutters by a reciprocating plunger.

The invention is fully described in the following specification and shown in the accompanying drawings, in which.

Figure 1:
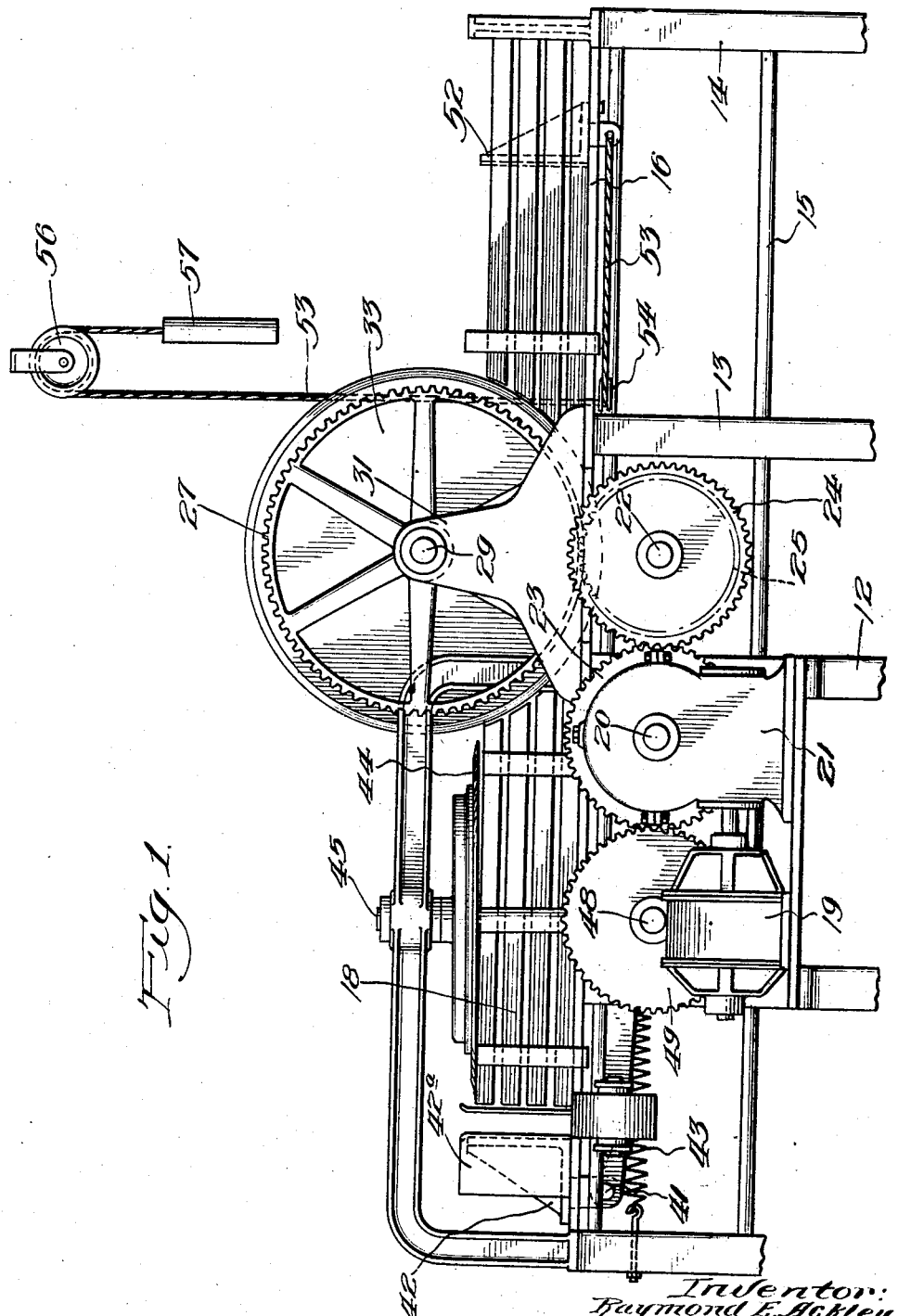
Figure 1 is a partial side elevation as viewed on the inclined line 1 of Fig. 4.

The embodiment illustrated comprises a main frame made up of a series of castings 10, 11, 12, 13 and 14 which are adapted to rest upon a floor or other level support and are connected by a series of rods 15 which run substantially the length of the machine.

For convenience in operation, as will be hereinafter pointed out, the top of the frame is inclined at a considerable angle to the horizontal as is clearly shown in Figs. 4 and 5. A bed or way 16 extends substantially throughout the length of the machine and rests upon said frame. Lateral guides 17 and 18 extend along the sides of the bed or way.

An electric motor 19 is secured to the main frame and drives a shaft 20 by means of gearing (not shown) contained within the gear case 21. The shaft 20 is suitably driven in bearings on the main frame as is also the shaft 22 which is driven thereby through meshing gears 23, 24.

The shaft 22 has keyed thereon gears 25 and 26 which mesh with gears 27 and 28 respectively. The latter are keyed on shafts 29, 30 which are journaled in suitable standards 31, 32 which are carried by the main frame. At the inner end of each of these shafts is secured a circular cutter, the inner faces of which are preferably flat, while the outer faces are tapered.

Figure 4:
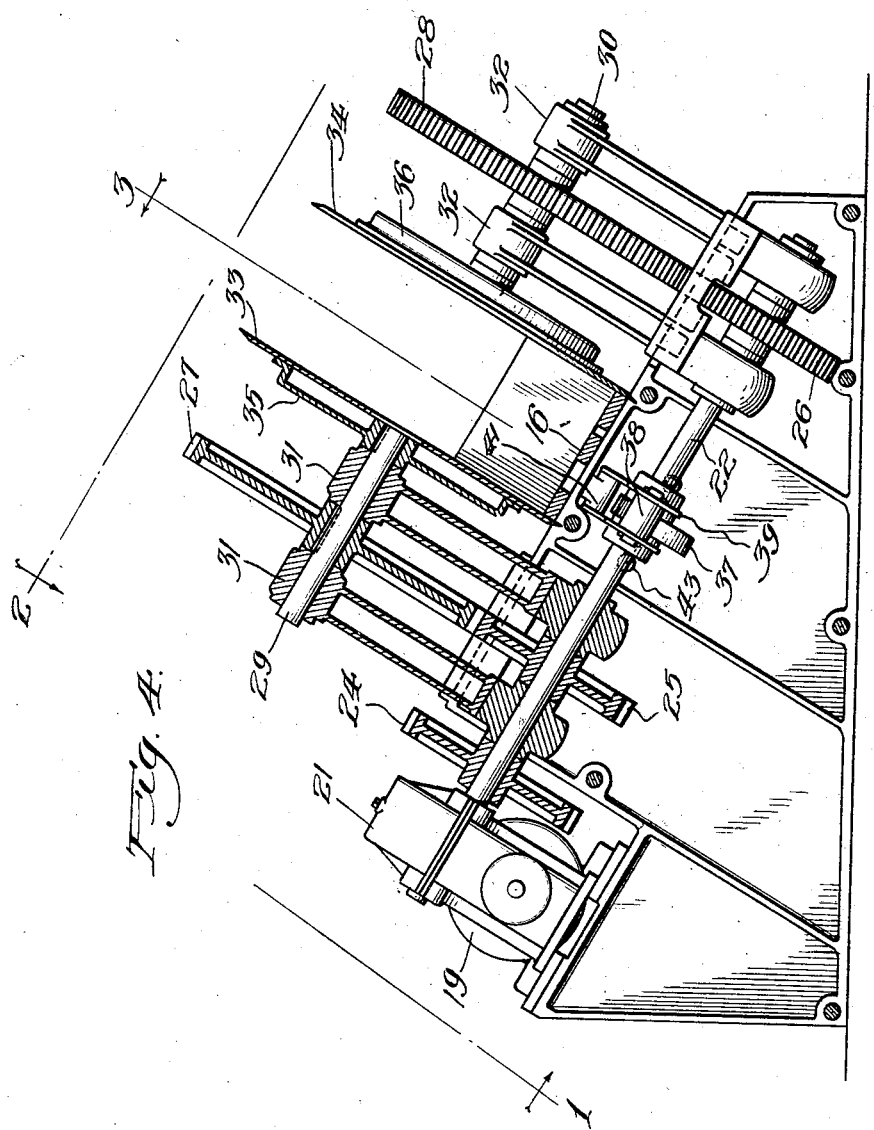
Fig. 4 is a transverse sectional view on the broken line 4—4 of Fig. 2.

These cutters lie along the sides of the bed 16 as shown in Fig. 4 and are reinforced by means of backing members 35, 36. The guides 17, 18 are cut away to the point where the cutters 33, 34 occur.

Figure 2:
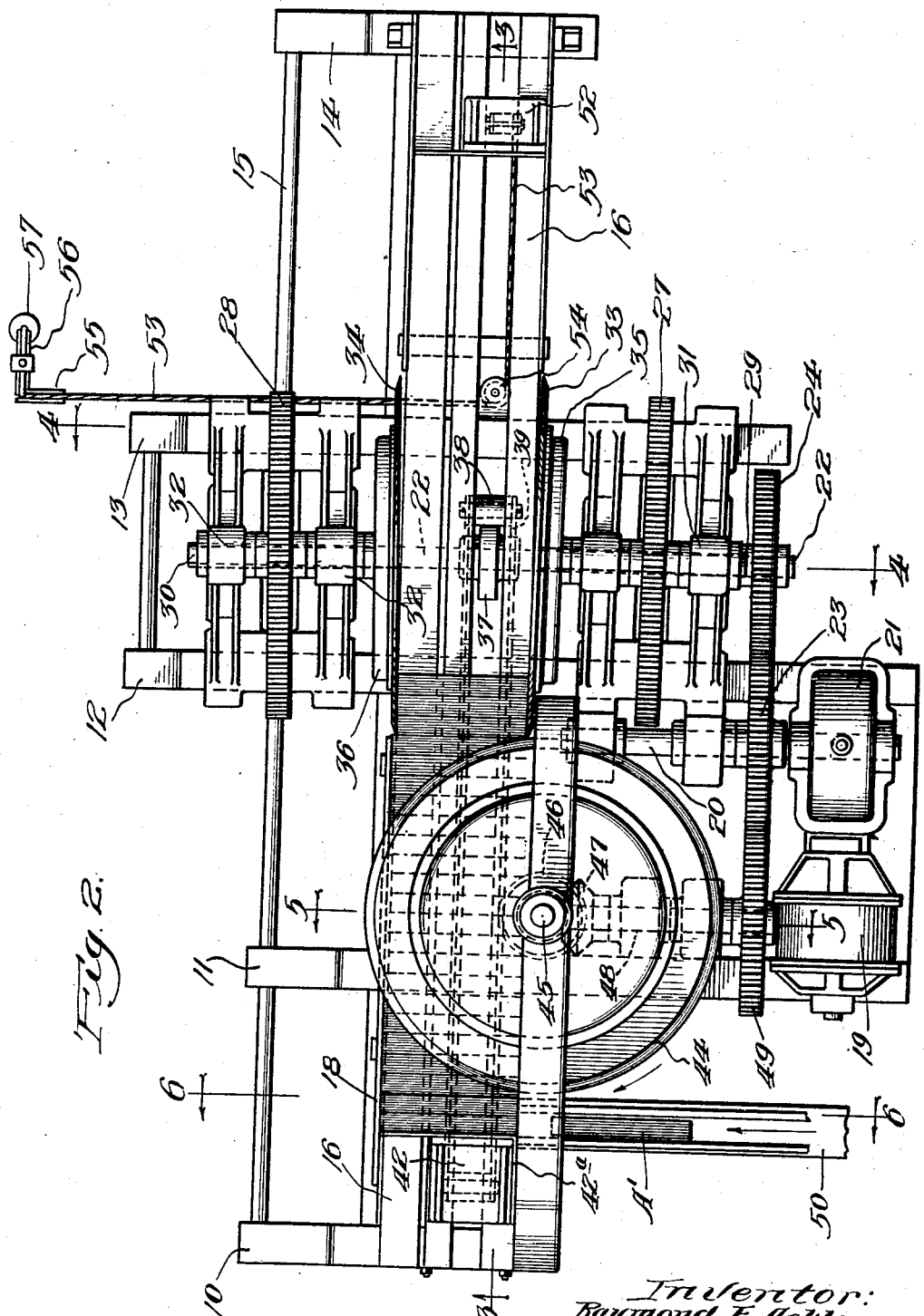
Fig. 2 is a top plan view as viewed on the inclined line 2 of Fig. 4.

While the shafts 29, 30 are substantially in alignment, they are turned inward slightly as shown in Fig. 2 so that the cutters 33, 34 are slightly closer together to the left or forward end of the machine than at the rear. This provides a clearance for the books as they pass through as will later be described.

Figure 3:
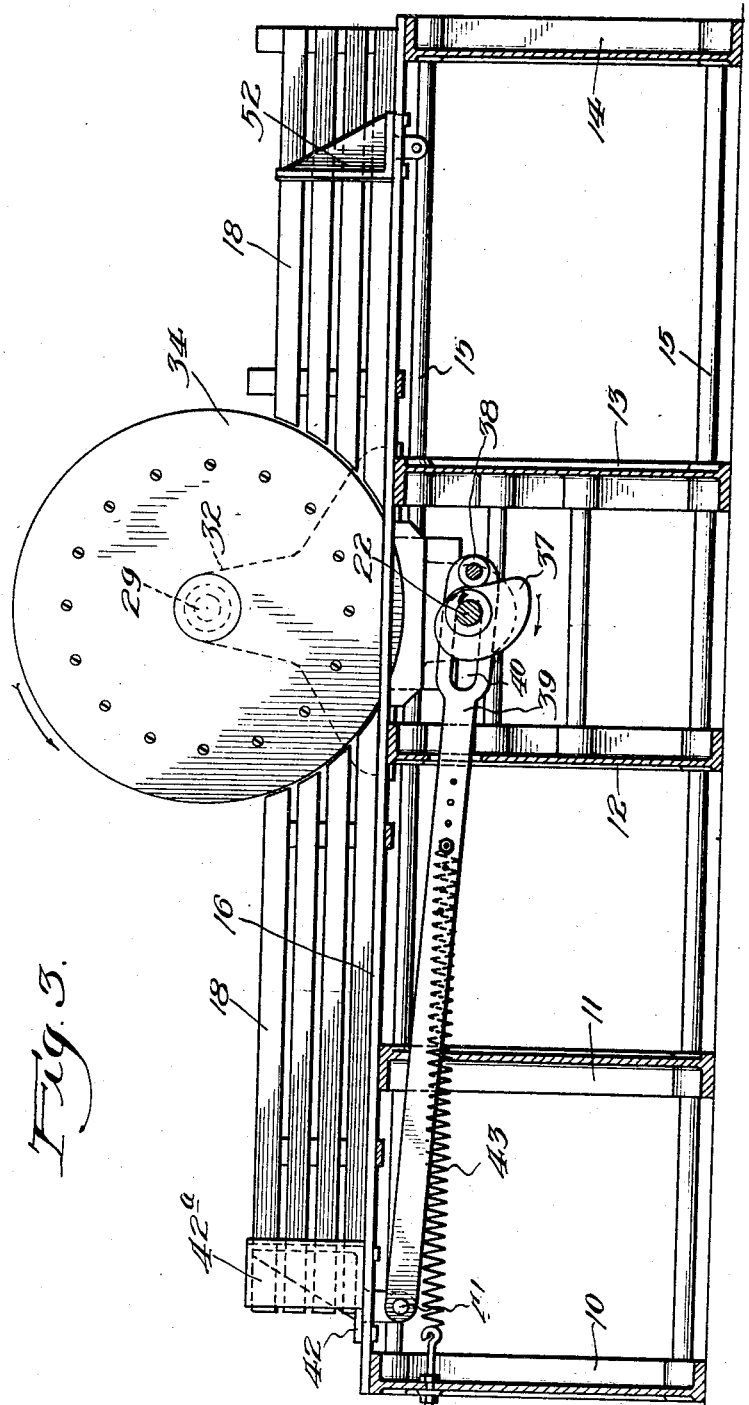
Fig. 3 is a longitudinal vertical section on the inclined line 3 of Fig. 4.

Referring now to Fig. 3, the shaft 22 is provided with a cam 37 which engages a cam follower 38, the latter being carried upon a reciprocating rod 39 which has a slot 40 therein through which passes the shaft 22. In this way the end of the rod 39 is guided. The other end of the rod 39 is hingedly mounted on a pin 41 which is carried by a plunger 42, the latter being guided in the bed 16. The rod 39 is normally retracted by means of a spring 43 so that the cam follower 38 is always in contact with the face of the cam 37.

From the foregoing it will be understood that as the shaft 22 is driven by the motor 19, the plunger 42 reciprocates through the action of the cam 37 and the rod 39 at each rotation of the shaft. As the books are then fed to the bed or way which will hereinafter be explained, these are then forced toward the rotary cutter 33, 34. At the same time these rotary cutters are revolving in a counter-clockwise direction as shown in Fig. 3 with the result that the books are simultaneously trimmed at the top and bottom as they pass through the cutters.

Figure 5:
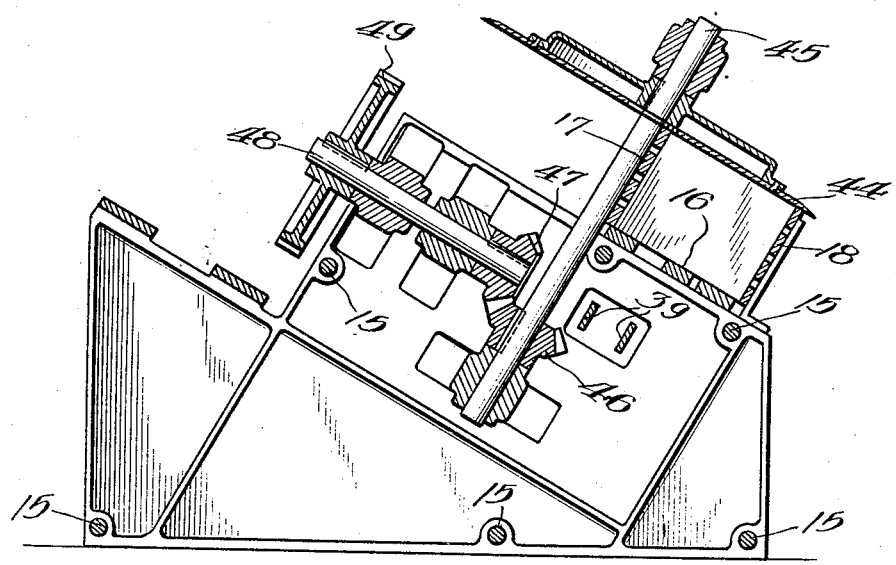
Fig. 5 is a similar view on line 5 of Fig. 2.
Figure 6:
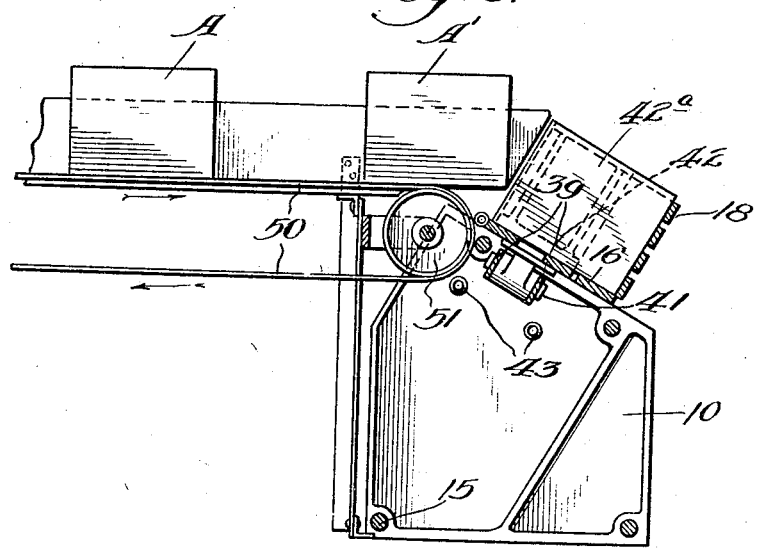
Fig. 6 is a transverse sectional view on the line 6—6 of Fig. 2.

A similar rotary trimming disk 44 is mounted above the books as shown in Fig. 5 and is carried upon a shaft 45 which also carries a bevel gear 46 which meshes with a bevel gear 47 upon a shaft 48. The latter being driven by means of a spur gear 49 which meshes with the gear 23. Thus the rotary cutter 44 trims the upwardly turned faces of the books as they are forced into it by the reciprocating plunger 42.

While the books to be trimmed may be fed to the trimming machine by hand, if desired, the books may be placed one or more at a time, depending upon the size of the books, in front of the plunger 42 while in its retracted position as shown in Figs. 2 and 3. I prefer, however, to feed the books automatically to the machine and for this purpose I have provided a conveyor belt 50 operating over a pulley 51 and driven by mechanism, not shown. Books A, A' are placed on this conveyor and driven along until they are deposited one at a time in front of the plunger 42. The face 42ª of this plunger is made smooth so as to serve as a stop which holds the books back at each forward movement of the plunger at which time it runs past the opening from the conveyor, bed or way, entirely closing it. On the return of the plunger 42 to its retracted position the space in front of the conveyor is opened somewhat more than the full width of the book so that the next book in the conveyor readily drops into this space.

After the books have passed the cutters 33, 34, they may pass in any desire manner out through the outer end of the bed. For certain purposes, however, it is desired that these shall be yieldably held by hand and for this purpose I have provided a yieldable stop 52 which is guided in the bed and which is connected by means of a rope 53 which passes over pulleys 54, 55 and 56 and is attached to a weight 57 which tends to keep the stop 52 adjacent the cutters 33, 34.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a book trimming machine, a support, means for forcing books along said support, rotary cutters arranged along the sides of said support, said cutters being set at a slight angle to the sides of said support so that the books are relieved of pressure as they advance past the cutting edges, and means for rotating said cutters.

2. In a book trimming machine, a support means for forcing books along said support, a rotary cutter arranged along a side of said support and having a flat side and a beveled side, the flat side of said cutter being angled slightly to the path of said books, and means for rotating said cutter.

3. In a book trimming machine, a support, a journalled shaft at each side of said support, a rotary cutter carried on one end of each shaft along a side of said support, means for rotating said shafts, a lower shaft geared to both said cutter shafts, a plunger slidably mounted along said support, and means for reciprocating said plunger comprising a cam carried by said lower shaft, and a connecting rod operably connecting said cam and plunger.

4. In a book trimming machine, the combination of rotary cutters spaced apart, means for feeding books between said cutters, said cutters being so disposed that they trim opposite edges of the books, said cutters being set at an angle to the path of movement of said books so that the books are relieved of pressure as they advance past the cutting edges of said cutters, and means for rotating said cutters.

5. In a book trimming machine, the combination of rotary cutters spaced apart, means for feeding books between said cutters, journalled shafts at opposite sides of the path of movement of said books and on which said cutters are mounted, and means for rotating said shafts, said shafts being slightly angled to each other so that those portions of the cutters from which the books emerge are farther apart than the portions where the books enter.

6. In a book trimming machine, a rotary cutter for cutting edge portions of the books, means for feeding books to said cutter, said cutter having a flat side and a beveled side, the flat side of said cutter being angled slightly to the path of movement of said books, and means for rotating said cutter.

7. In a book trimming machine, a support, reciprocating means for forcing books along said support, cutter means in the path of movement of the books, and means engageable by the books after they pass such cutter means for yieldingly resisting the movement of the books by said reciprocating means.

8. In a book trimming machine, a support, reciprocating means for forcing books along said support, cutters disposed at opposite sides of the support and in the path of movement of the books, and means engageable by the books after they pass said cutters for yieldingly resisting the movement of the books by the reciprocating means.

In testimony whereof I have hereunto set my hand this 28th day of February, 1927.

RAYMOND E. ACKLEY.